No. 893,830. PATENTED JULY 21, 1908.
N. W. YOUNG.
HAY BALER.
APPLICATION FILED MAR. 29, 1907.
2 SHEETS—SHEET 1.
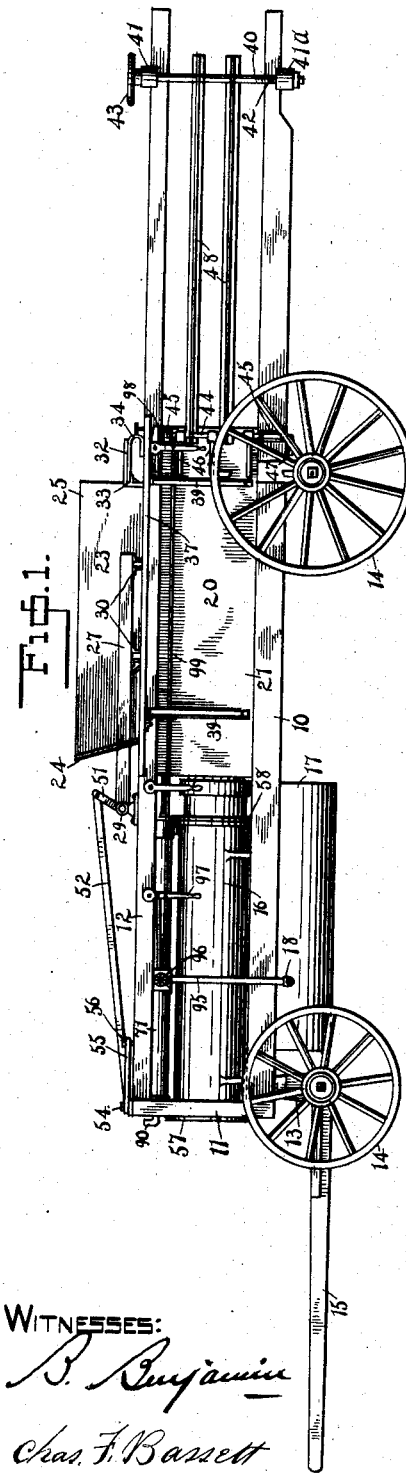
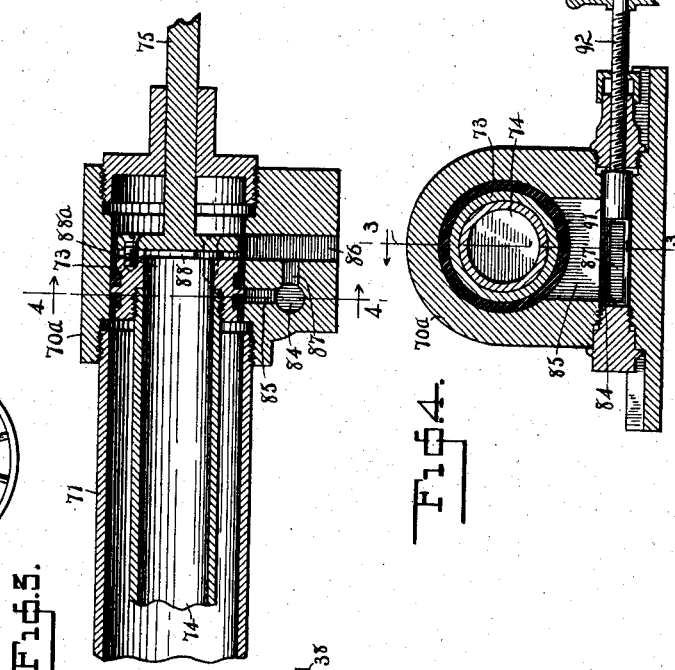
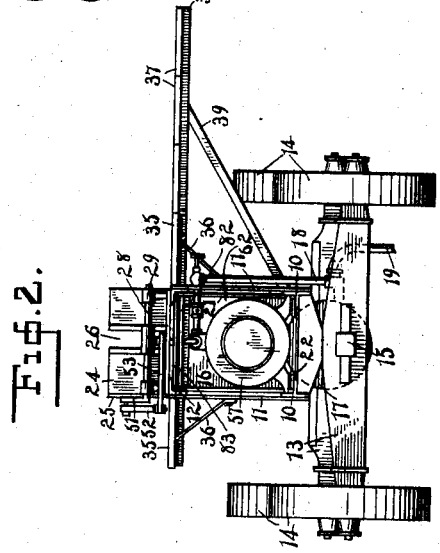
WITNESSES:
B. Benjamin
Chas. F. Bassett
INVENTOR:
Norris W. Young
BY Frederick Benjamin
ATT'Y.

No. 893,830.

PATENTED JULY 21, 1908.

N. W. YOUNG.
HAY BALER.
APPLICATION FILED MAR. 29, 1907.

2 SHEETS—SHEET 2.

WITNESSES:
R. Benjamin
Chas. F. Bassett

INVENTOR
Norris W. Young
BY Frederick Benjamin
ATT'Y.

UNITED STATES PATENT OFFICE.

NORRIS W. YOUNG, OF SHERWOOD, OREGON.

HAY-BALER.

No. 893,830.　　　　Specification of Letters Patent.　　　Patented July 21, 1908.

Application filed March 29, 1907. Serial No. 365,312.

*To all whom it may concern:*

Be it known that I, NORRIS W. YOUNG, citizen of the United States, residing at Sherwood, in the county of Washington and State of Oregon, have invented certain new and useful Improvements in Hay-Balers, of which the following is a specification.

My invention relates to apparatus for compressing hay and other loose material and refers more especially to that class of baling apparatus in which power is derived from some motive fluid, such as steam or air under pressure, and applied by means of a piston working in a cylinder.
The chief objects of my invention are to furnish improved means for controlling the valve action; to provide mechanism for regulating the inlet capacity for the motive fluid; to increase the caliber of the exhaust ports;
to furnish an apparatus that can be quickly installed and that can be used in locations where belt controlled mechanism would be unavailable, and to provide a simple appliance for the purpose in view.
Further advantages of my improvement lie in the increased efficiency acquired by reason of the greater rapidity secured in the plunger movements, thus producing a larger output, and the ability to exert a greater pressure when desired in order to turn out heavier bales without adding materially to their bulk.

In the usual form of belt-driven apparatus heavy fly wheels and large gears are needed and result not only in a waste of the power necessary to overcome the inertia of these heavy masses of metal, but produce an irregular movement and this design for power transmission causes a limitation in the stroke of the plunger for which reason only small feeds can be taken. I overcome these difficulties and disadvantages by transmitting the motive fluid to the cylinder by means of flexible tubing, and actuate the plunger by automatically operated valve gear so that the resulting movements are rapid, uniform and readily controllable.

Figure 5:
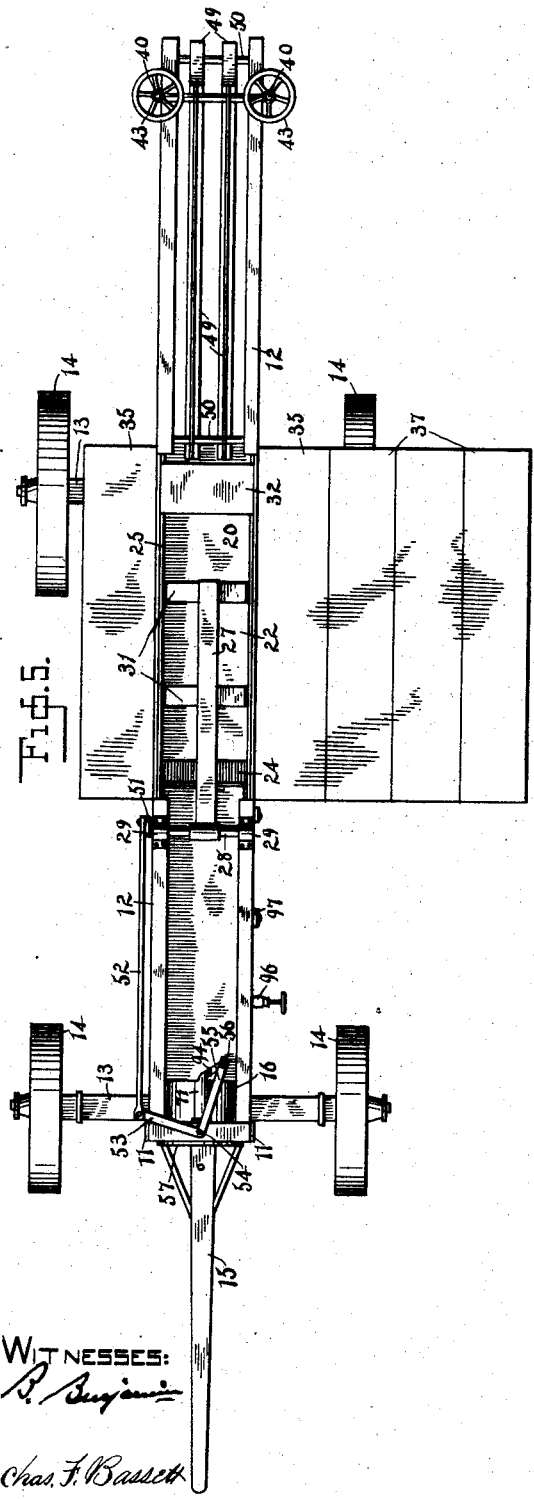
Figure 6:
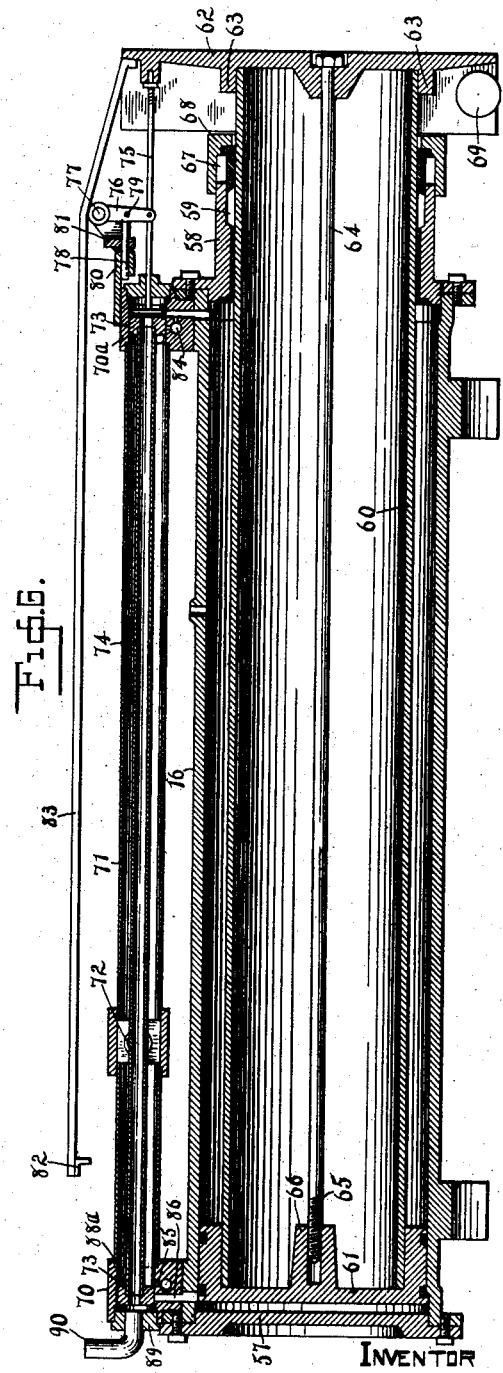

In the accompanying drawings which form a part of this specification: Figure 1 is a side view of my improved baling machine adapted to compress hay into bales of a convenient size for handling; Fig. 2 is an end view of the complete machine; Fig. 3 is a fragmentary sectional view of one of the valve cages on the line 3—3 of Fig. 4; Fig. 4 is a transverse section on the line 4—4 of Fig. 3; Fig. 5 is a plan view of the complete machine, and Fig. 6 is a longitudinal sectional view through the cylinder and valve chambers.

Referring to the drawings in detail the numeral 10 indicates the lower members of the frame preferably formed of T beams of steel connected by vertical braces 11 with the upper members 12 of the frame, conveniently formed of angle beams of steel. The frame thus formed is carried on axles 13 supported on ground wheels 14. The forward axle is furnished with a tongue 15 for the attachment of traction means to transport the apparatus from one locality to another.
An operating cylinder 16 is supported on the frame near the front end, and below said cylinder is suspended a storage tank 17 supplied with a pipe 18 to which may be attached a flexible tube or hose 19 for connection with a source of motive fluid supply.

A compression chamber 20 is located at the middle third of the frame and is composed of side plates 21 secured to the frame members 10 and 11, and a bottom plate 22 which rests on the T members 10. Above said chamber 20 is a feed hopper 23 composed of a front board 24, and an interchangeable side board 25. The front board is provided with a medium slot 26 to receive a feeder arm 27 secured at its front end to a transverse shaft 28 journaled in bearings 29 fixed to the angle members 12. To the under side of said feeder arm 27 are secured a plurality of packing forks 30, having laterally extending arms 31 one side and the rear end of the hopper are open, and across the open end is arranged a platform 32, resting upon a throat block 33 and throat block springs 34. Upon either side of the compression chamber are placed permanent tables 35, supported by braces 36 secured to the side plates 21. It is desirable to widen these tables when in use and for this purpose additional boards or leaves 37 are provided, which are carried on extension bars 38, supported by removable braces or struts 39. These extension leaves 37 and struts 39 may be changed from one side of the compression chamber to the other to suit the circumstances as they arise.

Near the rear end of the frame members 10 and 12 are placed tension bolts 40 journaled in bearings 41, 41ª, fixed to said members 10 and 12. The lower ends of said bolts are provided with threads 42 which engage similar threads cut in the lower bearing 41ª.

The said bolts are operated by hand wheels 43 fixed to their upper ends. Near the rear end of the compressing chamber are vertical shafts 44 journaled in bearings 45, and carrying dogs 46. The lower end of each of said shafts 44 is provided with an arm 47 connected to the arm of the opposite shaft by a coiled spring 48 in the usual manner. The said dog shafts 44 and the tension bolts 40 are supported by spaced bars 48 which form sides for a reserve compartment continuous with the compressing chamber. The top and bottom of said compartment are formed of similar bars 49 supported by cross pieces 50 fixed to the frame members 10 and 12. To one end of the feeder shaft 28 is secured a rock arm 51 pivoted to a connecting rod 52 which is flexibly attached at the front end to one arm 53 of a bell crank lever pivoted to the frame at 54 the other arm 55 having a depending lug 56 which is operatively engaged in a manner hereinafter described.

The operating cylinder 16 is supplied with cylinder heads 57, 58, the head 58 being furnished with an aperture 59 to receive the piston rod 60 which for the purpose of lessening the weight, is a hollow tube a little longer than the cylinder bore. Upon the inner end of the said rod 60 is secured a piston 61 and upon its opposite end is mounted a plate or plunger 62 rectangular in form to correspond with the compression chamber and having projecting from its face an annular flange 63 which engages the end of the piston rod 60.

The plunger 62 and the piston 61 are securely fixed to the said piston rod by a bolt 64 which passes through the said plunger and is provided at the end with threads 65 which engage similar threads in a boss 66 formed integral with said piston. The cylinder head 58 is provided with a stuffing box 67 closed by a nut 68. The plunger 62 is furnished with rollers 69 which travel on the flanges of the frame pieces 10 and support the weight of the plunger and piston rod when extended.

Upon the upper side of the cylinder are located valve cages 70, 70ª, connected by a pipe 71, with which an inlet pipe 72 communicates. Within the cages are located valves 73 connected by a pipe 74 which is placed concentric with the surrounding pipe 71 and has the function of an exhaust passage for the spent motive fluid. The valves are reciprocated by a valve stem 75 pivotally connected to a rock arm 76 which moves on a center 77, the stem 75 being extended beyond the rock arm to be received in a socket in the plunger face when said plunger is in its retracted position, a nut serving to adjust the throw. The opposite valve movement is accomplished by a short connecting rod 78 pivoted at 79 to said rock arm 76 and supported in a guide piece 80 attached to the valve cage 70ª. Upon said rod is located a knock off block 81 with which a trip 82 fixed to a plate 83 attached to the plunger 62, engages when the said plunger is near the limit of its outward travel, and moves the valves in a direction opposite to that given by the action of the plunger against the said valve stem.

Below the valve seat in each cage is located an inlet passage 84 which communicates with the valve chamber by a port 85 except when said port is closed by the valves and with a passage 86 by a port 87. The passage 86 communicates with the interior of the pipe 74 when the valve is in one position through a free exhaust port 88 which communicates with the exhaust pipe 74 through a central opening 88ª in the valve body which is continuous with said pipe. The bushing 89 of the valve cage 70 has an aperture which communicates with the valve chamber and is supplied with an exhaust vent pipe 90 opening to the outer air.

The inlet passage 84 is fitted with a central plug 91 furnished with a threaded stem 92 to which is fixed a hand wheel 93. By this means the inlet ports are regulated with ease and nicety and the operator is enabled to control the speed of the plunger as desired.

The feeder arm 27 is held in a vertical position when the plunger is extended and when the latter is retracted a slot 94 in the plate 83 engages the lug 56 which depends from the arm 55 of the bell crank lever and causes said feeder arm to descend so as to pack the feed into the compression chamber when the plunger is again extended the said slot will raise the feeder arm to its vertical position.

The storage tank 17 is connected by a pipe 95 with the inlet pipe 71 and is supplied with a control valve 96. In order to afford a convenient means of operating the throttle two levers 97, 98, are placed at intervals and connected by a link rod 99 so that either lever can be used as desired. The passages 86 which are alternately opened and closed by the reciprocation of the valves 73 have at different times the function of inlet and exhaust ducts.

Referring to Fig. 6 the live steam is entering the bore of the cylinder behind the piston from the pipe 71 through port 85, passage 84, and port 87 to the passage 86 which connects with the said bore. At the opposite end of the cylinder the exhaust is through passages 86 and 88, traversing the exhaust pipe 74 and reaching the open air through the left hand valve port 88ª and exhaust vent pipe 90.

The operation of the apparatus is as follows: Connection having been made with the motive fluid supply which for the sake of convenience we will consider to be steam, and the extension table being in position on the open side of the hopper, the hay is thrown upon said table and the steam is then allowed to enter the cylinder and force the piston and attached plunger out through the compression chamber. During this movement a man standing upon the platform places the hay in the hopper, where it is supported upon the plate carried by the plunger and held out of the compressing chamber the feeder arm having assumed a vertical position as soon as the piston begins its outward stroke. When the piston returns the plate 83 will be also retracted and when the slot 94 in said plate 83 engages the lug 56 the feeder arm will be depressed its attached forks forcing the hay to the bottom of the said chamber, the next stroke of the plunger forcing it to the end of the compartment where it is held by the dogs 46. This procedure is repeated until that portion of the frame beyond the compression chamber which has been termed the reserve-compartment is well filled with the compressed material. According to the usual procedure slotted blocks are placed at regular intervals as the baling progresses to facilitate the placing of wires or ties to secure the bales. Such blocks are not illustrated in the drawings, however, as they form no part of my invention.

The rear end of the frame where the tension bolts are located is somewhat smaller in cross area than near the compression chamber and the compressed material is thus further acted upon by the frame to condense the material into a smaller compass thus causing sufficient friction to present the desired resistance to the plunger stroke during the packing process.

It is obvious that many changes may be made in the devices of my invention as herein disclosed without departing from the spirit and scope thereof and I do not wish therefore to be limited to the precise construction set forth.

Having thus described my invention what I claim, is

1. In a baling press, the combination with the frame, a compressing chamber, a plunger arranged in said chamber, and operative means for the plunger, of a rock-shaft, a feeder arm attached to said shaft, a slotted member actuated by the plunger, and means engaging said slot for operating said rock-shaft.

2. In a baling press, the combination with the frame, a compressing chamber, a reserve compartment, a plunger in the compressing chamber, and operative means for the plunger, of a rock-shaft, a feeder arm fixed to said shaft, a plurality of blades on said arm, a slotted member actuated by the plunger, and means engaging the slot for operating said rock-shaft.

3. In a baling press, the combination with the frame, a compressing chamber, a plunger arranged in said chamber, a cylinder, a piston for said cylinder, and a piston rod attached to said plunger, of a rock-shaft, a feeder arm mounted upon said shaft, a plurality of blades attached to said arm, and means connected with said plunger for operating said shaft, said means consisting of a slotted plate fixed to said plunger, a bell crank arm engaging the slot in said plate, and a rod connecting said bell crank arm with the rock shaft.

4. In a baling press, the combination with the frame, a compressing chamber, a variable reserve compartment, a plunger in the compressing chamber, and operative means for the plunger, of a rock-shaft, a feeder arm operated by the rock-shaft, a plurality of blades on said arm, a slotted member actuated by the plunger, and means engaging the slot in said member for operating said rock-shaft.

5. In a baling press, the combination with the frame, a compressing chamber, a reserve compartment, a plunger in the compressing chamber and operative means for the plunger, of a rock-shaft, a feeder arm carried by the rock shaft, a plurality of blades on said feeder arm, a slotted member actuated by the plunger, a bell crank lever engaging the slot in said member, and connection between said lever and the rock shaft.

6. In a baling press, the combination with the frame, a compressing chamber, a plunger in the compressing chamber, and operative means for the plunger, of a reserve compartment consisting of longitudinally disposed flexible bars, means for deflecting said bars, a rock-shaft, a feeder-arm having a plurality of attached blades, a slotted plate fixed to the plunger, a bell-crank lever engaging the slot in said plate and a rod connecting said lever with the rock shaft.

In testimony whereof I affix my signature in presence of two witnesses.

NORRIS W. YOUNG.

Witnesses:
JOHN W. THORNTON,
JOE J. THORNTON.